US010738597B2

(12) United States Patent
Bhongale et al.

(10) Patent No.: US 10,738,597 B2
(45) Date of Patent: Aug. 11, 2020

(54) FREQUENCY COMB FOR DOWNHOLE CHEMICAL SENSING

(71) Applicant: Halliburton Energy Services, Inc., Houston, TX (US)

(72) Inventors: Satyan Gopal Bhongale, Cypress, TX (US); Daniel Joshua Stark, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 232 days.

(21) Appl. No.: 15/565,382

(22) PCT Filed: May 20, 2015

(86) PCT No.: PCT/US2015/031830
§ 371 (c)(1),
(2) Date: Oct. 9, 2017

(87) PCT Pub. No.: WO2016/186669
PCT Pub. Date: Nov. 24, 2016

(65) Prior Publication Data
US 2018/0073355 A1 Mar. 15, 2018

(51) Int. Cl.
E21B 47/135 (2012.01)
G01J 3/44 (2006.01)
(Continued)

(52) U.S. Cl.
CPC .......... E21B 47/135 (2020.05); E21B 49/00 (2013.01); E21B 49/08 (2013.01); G01J 3/0218 (2013.01);
(Continued)

(58) Field of Classification Search
CPC ........ E21B 47/123; E21B 49/00; E21B 49/08; G01J 3/0218; G01J 3/10; G01J 3/44; G01N 21/65; G01N 21/8507
(Continued)

(56) References Cited

U.S. PATENT DOCUMENTS 7,483,143 B2  1/2009 Sanders et al.
8,417,748 B2  4/2013 Chang
(Continued)

FOREIGN PATENT DOCUMENTS

AU  2011211336      8/2011
CN  101540049 A  *  9/2009
(Continued)

OTHER PUBLICATIONS

Derwent English Abstract of CN 101540049 A (Year: 2009).*
(Continued)

Primary Examiner — David P Porta
Assistant Examiner — Abra S Fein
(74) Attorney, Agent, or Firm — Thomas Rooney; C. Tumey Law Group PLLC

(57) ABSTRACT

The present disclosure relates to systems and methods for analyzing fluids. The method for analyzing a chemical sample within a wellbore, contained within an interrogation device, may comprise broadcasting a coherent light from a frequency comb module, directing the coherent light through a fiber optic line to the interrogation device, irradiating the chemical sample with the coherent light, capturing light resulting from the irradiation of the chemical sample, and producing a spectrum resulting from the captured light from the chemical sample. A frequency comb system for analyzing a chemical sample may comprise a frequency comb module configured to broadcast a coherent light and a fiber optic line that extends into a wellbore to an
(Continued)

interrogation device. The interrogation device may further be configured to contain the chemical sample for irradiation by the coherent light. The frequency comb system may further comprise a receiver and an information handling system.

20 Claims, 3 Drawing Sheets

(51) Int. Cl.
G01J 3/10 (2006.01)
G01N 21/65 (2006.01)
G01N 21/85 (2006.01)
G01J 3/02 (2006.01)
E21B 49/00 (2006.01)
E21B 49/08 (2006.01)

(52) U.S. Cl.
CPC . *G01J 3/10* (2013.01); *G01J 3/44* (2013.01); *G01N 21/65* (2013.01); *G01N 21/8507* (2013.01); *G01N 2021/653* (2013.01); *G01N 2021/855* (2013.01); *G01N 2021/8528* (2013.01)

(58) Field of Classification Search
USPC ...................................................... 250/269.1
See application file for complete search history.

(56) References Cited

U.S. PATENT DOCUMENTS

| | | | |
|---|---|---|---|
| 8,670,620 B2 | 3/2014 | Kelly et al. | |
| 8,693,004 B2 | 4/2014 | Chandler et al. | |
| 2007/0013911 A1 | 1/2007 | Difoggio | |
| 2010/0029552 A1* | 2/2010 | Watt | C07K 7/06 514/12.2 |
| 2010/0225897 A1 | 9/2010 | Fermann et al. | |
| 2010/0282959 A1 | 11/2010 | Dong et al. | |
| 2011/0255554 A1 | 10/2011 | Delfyett | |
| 2012/0002212 A1* | 1/2012 | Chandler | G01J 3/42 356/454 |
| 2012/0059587 A1 | 3/2012 | Marsh et al. | |
| 2013/0342836 A1 | 12/2013 | Newbury et al. | |
| 2014/0253915 A1 | 9/2014 | Ataie et al. | |
| 2014/0307249 A1* | 10/2014 | Peremans | G01N 21/636 356/51 |
| 2016/0356917 A1 | 12/2016 | Bhongale et al. | |
| 2017/0198568 A1 | 7/2017 | Nitsche et al. | |

FOREIGN PATENT DOCUMENTS

| | | |
|---|---|---|
| WO | 2008032193 | 3/2008 |
| WO | 2009064557 | 5/2009 |
| WO | 2011146068 | 11/2011 |
| WO | 2013066654 | 5/2013 |
| WO | 2014102572 | 7/2014 |
| WO | 2014137354 | 9/2014 |
| WO | 2014154708 | 10/2014 |

OTHER PUBLICATIONS

"Laser Spectroscpoy and Frequency Combs" by Hansch et al., published in 2013.
"Fiber laser-based frequency combs with high relative frequency stability" by Newbury et al., published in 2007.
"Optical frequency comb generated by four-wave mixing in highly nonlinear fibers" by Boggio et al., published in 2009.
"Recent advances in linear and non-linear Raman spectroscopy" by Laurence A Nafie, dated Oct. 21, 2015.
"Mid-infra-red frequency combs" by Schliesser et al., dated Jun. 28, 2012.
"Coherent Cavity enhanced dual-comb spectroscopy" by Fleisher et al., published in 2012.
"Molecular finger printing with the resolved modes of a femto second laser frequency comb" by Diddams et al., dated Feb. 8, 2007.
"Raman-induced Kerr-effect dual-comb spectroscopy" by Ideguchi et al., dated Nov. 1, 2012.
"Spatial/spectral endmember extraction by multidimensional morphological operations" by Plaza et al., dated Sep. 9, 2002.
"Endmember Extraction Methods: A short review" by Veganzones et al., published in 2008.
"The sequential maximum angle convex cone (SMACC) endmember model" by Gruninger et al.
International Search Report and Written Opinion for PCT Application No. PCT/US2015/031830 dated Feb. 16, 2016.
Search report for Dutch application No. 139539 dated Nov. 11, 2016.

* cited by examiner

FREQUENCY COMB FOR DOWNHOLE CHEMICAL SENSING

BACKGROUND

The present disclosure relates to systems and methods for analyzing fluids. More particularly, the present disclosure relates to detecting the presence of chemicals downhole using frequency combs.

Spectroscopy may be defined as the study of energy radiated, scattered, and/or absorbed by matter/chemicals in response to a stimulus/perturbation. The study of that energy may produce data, represented by a spectrum, which may be used to identify the matter or chemicals in question. Two different materials typically produce unique spectra in response to the same perturbation. Different wavelengths and/or frequencies of radiative energy may help identify the matter. In known methods, however, spectroscopy uses large bandwidth, a high resolution in wavelength, and large amounts of energy to produce different wavelengths and/or frequencies. This makes spectroscopy within a wellbore difficult and expensive. Furthermore, a spectrum of chemicals in liquid form tends to be broad, requiring both significant energy and time.

BRIEF DESCRIPTION OF THE DRAWINGS

These drawings illustrate certain aspects of some of the examples of the present invention, and should not be used to limit or define the invention.

DETAILED DESCRIPTION

Figure 1:
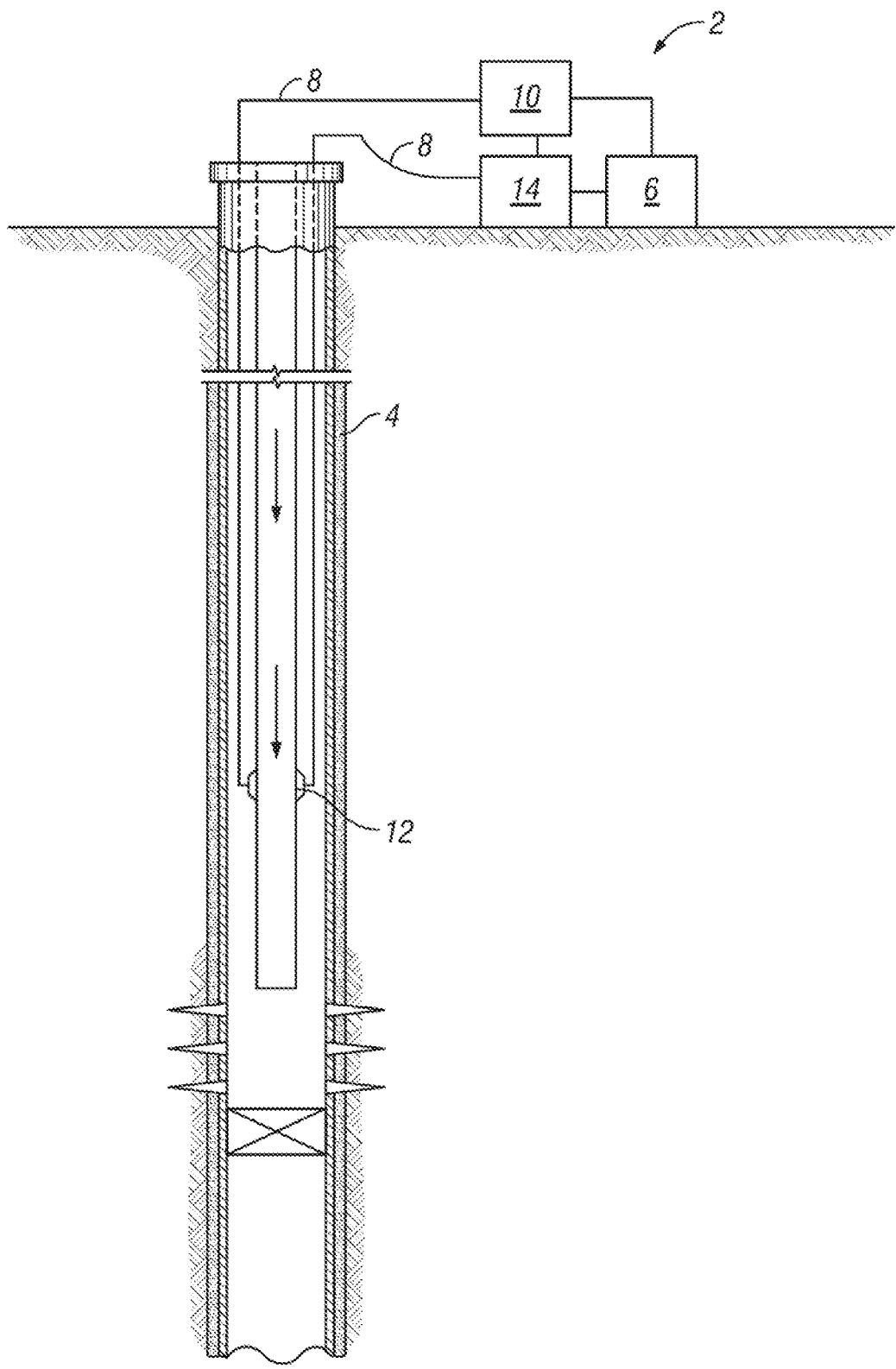
FIG. 1 is a schematic illustration of an example of a frequency comb system used in a wellbore.

The present disclosure relates to a method and system for detecting the presence of different chemicals downhole, more particularly, a method and system using spectroscopy. The disclosure describes example methods and systems that identify chemicals using light, capture the scattered light, and analyze the spectrum of the captured light. Specifically, the light may be used to capture the vibrational and rotational spectrum of molecules in the liquid phase. For many liquids, especially hydrocarbons, the vibrational/rotational spectrum may be located in the radio frequency (RF) range. The spectral signature of a chemical may comprise one or more peaks, depending on the molecules within a sample. Peaks within a spectral signal may be broad, narrow, overlap with other peaks, and/or any combination thereof. In some known methods, there may be problems with using spectroscopy downhole. In known methods, there is a tradeoff between bandwidth and imaging speed. Detecting multiple and possibly unexpected chemicals with high resolution may require long measurement times to capture a broad frequency range. Additionally, it may be difficult to send a coherent RF source downhole without dissipating most of the energy before irradiating the chemical sample.

Certain examples of the present disclosure may be implemented at least in part with an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In certain examples, the present disclosure may use fiber optics. Fiber optic cables may be used to transmit light for communications and optical sensing. For example, in optical sensing, light may be used to acquire various signal types, such as temperature, pressure, strain, acceleration, chemical spectral signatures and the like. Optical sensing may be used in a wellbore by communicating light between a source and downhole sensors or actuators (or both). The fiber optic cables may be embedded in the wellbores casing and/or run down into the wellbore with a well tool (e.g., a logging tool string in a drill pipe string). Sensing applications may be used in interrogation to determine the different chemicals within a chemical sample.

This disclosure describes example systems and methods which may detect the presence of different liquid chemicals downhole using coherent anti-Stokes Raman scattering (herein referred to as CARS) with frequency combs. A frequency comb, used as a light source, may generate radiated energy for use in spectroscopy. Generating different and varying frequencies with a frequency comb may be accomplished through amplitude modulation of a continuous wave laser, stabilization of the pulse train generated by a mode locked laser, microresonators, cavities, optical fibers, four wave mixing, electronically, and/or any combination thereof. Frequency combs may be used to generate, measure, and or analyze different colors, or frequencies, of light with very high spectral resolution. Frequency combs may accurately measure much higher frequencies and a broader range of frequencies than other frequency measuring tools. Additional benefits of using a frequency comb may include large bandwidths, high spectral resolution, high sensitivity for detection of trace quantities, and fast acquisition of information. Detecting the presence of different liquid chemicals may use CARS in conjunction with frequency combs. CARS is a nonlinear four-wave mixing process, which may be coherently driven when the energy difference of a pump and Stokes laser beam resonate with a Raman-active molecular transition. Scattering of the probe beam may provide a readout though generation of a high frequency shifted anti-Stokes signal enhanced by many orders of magnitude with respect to spontaneous Raman scattering.

A method for analyzing a chemical sample may comprise broadcasting a coherent light from a frequency comb module, directing the coherent light through a fiber optic line, irradiating the chemical sample within an interrogation device with the coherent light, capturing resulting light, and producing a spectrum from the chemical sample. The frequency comb module may comprise at least one frequency comb, a beam splitter, and a low pass filter. The method for analyzing a chemical sample may further comprise the step of altering the irradiated light from the frequency comb module with an information handling system, displaying the spectrum on an information handling system, comparing the spectrum with an identified spectrum sample from a known sample library, and comparing the spectrum with endmember extraction. The receiver may comprise a high pass filter and a photo-diode. Additionally, producing a sample during a method for analyzing a chemical sample may be performed using anti-Stokes Raman scattering and obtaining a phase spectra may be performed using Raman-induced Kerr-effect spectroscopy.

A method for analyzing a chemical sample within a wellbore, contained within an interrogation device, comprising broadcasting a coherent light from a frequency comb module, directing the coherent light through a fiber optic line to the interrogation device, irradiating the chemical sample with the coherent light, capturing light resulting from the irradiation of the chemical sample, and producing a spectrum resulting from the captured light from the chemical sample. The method may further comprise capturing the chemical sample in the interrogation device in the wellbore. The fiber optic line directing the coherent light may extend into the wellbore. The frequency comb module may comprise at least one frequency comb, wherein the frequency comb module comprises a beam splitter and a low pass filter. The method for analyzing a chemical sample may further comprising altering the irradiated light from the frequency comb module with an information handling system and displaying the spectrum on an information handling system. Using the display to compare the spectrum with an identified spectrum sample from a known sample library and/or comparing the spectrum with endmember extraction. Wherein the spectrum may be produced by at least one technique selected from the group consisting of anti-Stokes Raman scattering and Raman-induced Kerr-effect spectroscopy. The receiver within the method may comprise a high pass filter and a photo-diode.

A frequency comb system for analyzing a chemical sample, wherein the frequency comb system may comprise a frequency comb module configured to broadcast a coherent light, a fiber optic line that extends into a wellbore, wherein the fiber optic line may be configured to direct the coherent light from the frequency comb module to an interrogation device. The interrogation device may be configured to contain the chemical sample for irradiation by the coherent light. The frequency comb system for analyzing a chemical sample may further comprise a receiver positioned to capture light resulting from the irradiation of the chemical sample and an information handling system operable to analyze the captured light and produce a spectrum resulting therefrom. The frequency comb module may comprise a first frequency comb and a second frequency comb, wherein the frequency comb module further comprises a beam splitter and a low pass filter. The frequency comb system may further comprise a high pass filter and a photo-diode and the receiver may further comprises a low pass filter and a digitizer. The interrogation device may analyze the chemical sample using anti-Stoke Raman scattering, wherein the information handling system may further produce a phase spectrum using Raman-induced Kerr-effect spectroscopy. The information handling system may be connected to a digitizer, wherein the frequency comb module may further comprise a femtosecond laser.

Figure 2:
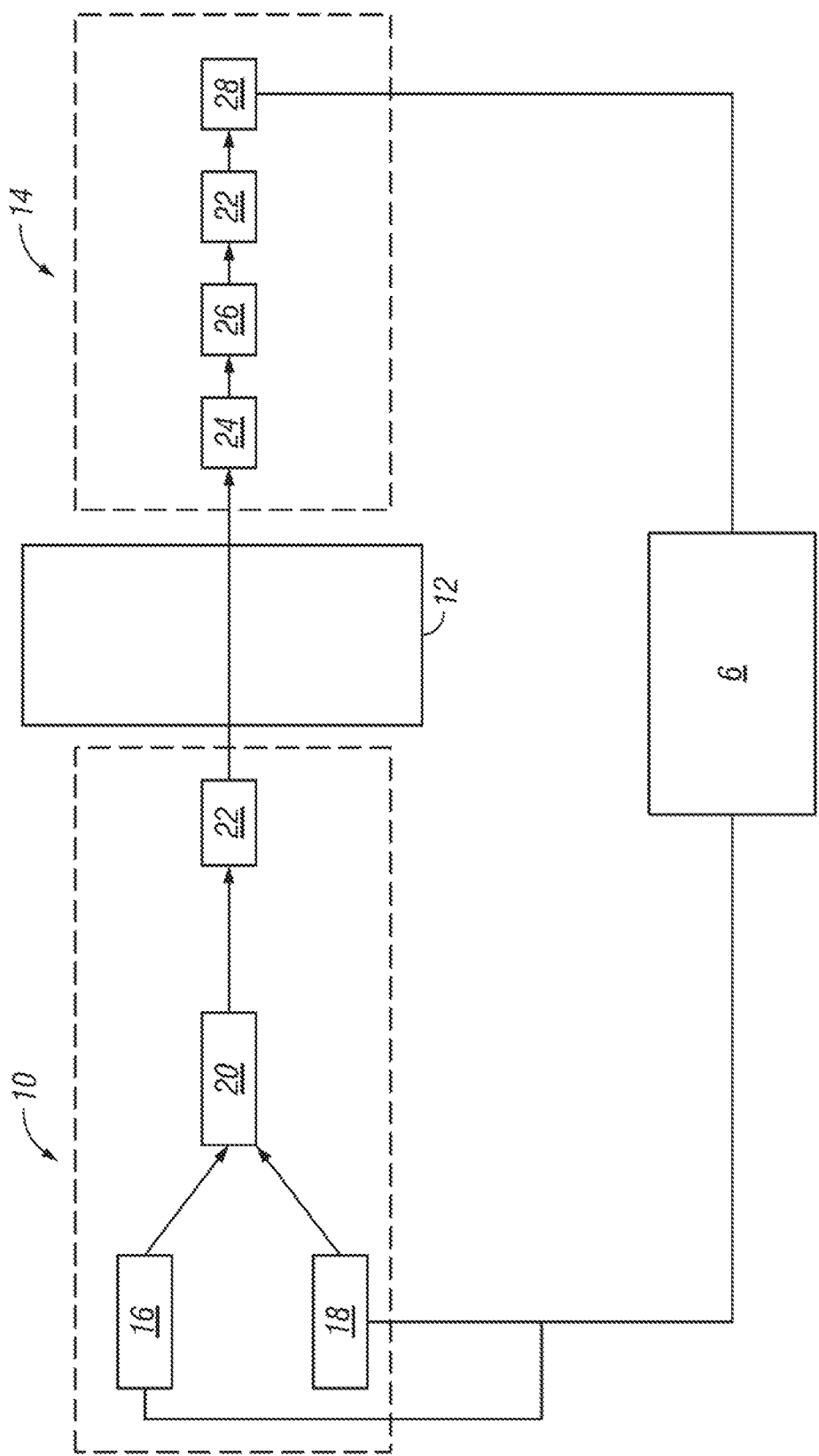
FIG. 2 is a schematic illustration of an example system for detecting chemicals in a sample.

FIG. 1 illustrates an example of a frequency comb system 2 for detecting liquid chemicals in a subterranean wellbore 4. Frequency comb system 2 may comprise an information handling system 6, fiber optic lines 8, a frequency comb module 10, an interrogation device 12, and/or a receiver 14. As described above, fiber optics may be suitable for sensing applications at remote, downhole locations in a subterranean wellbore 4. FIG. 1 illustrates an example where a frequency comb module 10, or plurality of frequency combs modules 10, may be disposed at a location (e.g., a surface outside subterranean wellbore 4) that is remote from the location or locations at which the analyses of samples are performed. In examples, not illustrated, frequency comb module 10, or a plurality of frequency comb modules 10, may be placed within subterranean wellbore 4, adjacent or near interrogation device 12. As illustrated in FIG. 2, frequency comb module 10 may comprise a plurality of frequency combs, a beam splitter 20, and/or a low pass filter 22.

In some examples, as illustrated in FIG. 2, frequency comb module 10 may comprise a first frequency comb 16 and a second frequency comb 18. In examples, there may be more than two frequency combs used within frequency comb module 10. First frequency comb 16 may produce a frequency f, and the second frequency comb 18 may produce a second frequency f+δf. A femtosecond laser, not illustrated, may be centered in the optical range and broadcast within first frequency comb 16 and second frequency comb 18. In examples, in place of the femtosecond laser, traditional free space lasers or fiber lasers may be used. Within frequency comb module 10, first frequency comb 16 and second frequency comb 18 may be combined within a beam splitter 20. A beam splitter 20 may combine the emitted light from first frequency comb 16 and second frequency comb 18 before transmission out of frequency comb module 10. A standard beam splitter 20 may use any medium, such as a cube made from two triangular glass prisms, to combine emitted light from first frequency comb 16 and second frequency comb 18. Light from beam splitter 20 may pass through a low pass filter 22 before exiting frequency comb module 10. A standard low pass filter 22 may electronically and/or optically pass light that has a certain frequency lower than a predetermined cutoff frequency and further attenuate signals with frequencies higher than the predetermined frequency. In examples, low pass filter 22 may be used to identify specific regions of the spectrum. Additionally, low pass filter 22 may allow for exciting the molecules from the ground state to the vibrational state. Passing through low pass filter 22, the remaining light may be emitted from frequency comb module 10. The light emitted from frequency comb module 6 may be broadcasted downhole through fiber optic lines 8, (e.g., shown on FIG. 1). For example, the emitted light may be broadcast through fiber optics lines 8 that extend into the wellbore 4.

Broadcasted light from frequency comb module 10 may be transmitted through fiber optic lines 8 (e.g., shown on FIG. 1) to interrogation device 12. An interrogation device 12 may comprise a chamber adaptable for deployment in the wellbore 4 and be configured to hold a sample of fluid. The chamber may comprise a transparent material. That material may not change the relevant optical properties of light. A chemical sample may be captured in the interrogation device 12 with subterranean wellbore 4. The chemical sample may comprise various fluids that may be present in the wellbore 4 and/or surrounding subterranean formation, such as liquid hydrocarbons, brines, and/or mixtures thereof. Chemical samples and/or any types of fluid may flow through interrogation device 12 by means of a cuvette, a microfluidic, a microcapillary tube, and/or any combination thereof. Cuvettes, microfluidics, microcapillary tubes, and/or any combination thereof may require constant flushing and/or cleaning to reduce cross contamination between chemical sampling. In examples the concentration of a continuous flow of chemical samples and/or fluids may be monitored by an information handling system 6 to determine when sampling the chemical fluids would prevent cross contamination. Interrogation device 12 may be used to perform interrogation of a chemical sample from within subterranean wellbore 4. Within interrogation device 12, a chemical analysis may be performed, irradiating the chemical sample with the combined light from frequency comb module 6. Irradiating the chemical sample may be achieved using a capillary plate which may capture chemicals within the capillaries. Additionally, microfluidic channels and/or sufficiently thin chambers with optical transparent, phase-maintaining windows may also be used. When analyzing the chemical fluid, often the fluid samples obtained downhole may comprise multiple chemical fluids. This may result in a sample that may produce a spectrum which may be a convolution of all the individual spectra of the individual chemical fluids.

A spectrum of the chemical sample may be produced using spectroscopy. In examples, any available spectroscopy method may be used in the present invention. For example, the spectroscopy may be selected from the group of absorption spectroscopy, fluorescence spectroscopy, visible absorption spectroscopy, ultraviolet (UV) spectroscopy, infrared (IR) spectroscopy, near-infrared (NIR) spectroscopy, Raman spectroscopy, coherent anti-Stokes Raman spectroscopy (CARS), laser spectroscopy, Fourier transform spectroscopy, and Fourier transform infrared spectroscopy (FTIR) and combinations thereof. By way of a certain examples, the spectroscopy may be selected from the group of infrared (IR) spectroscopy, near-infrared (NIR) spectroscopy, Fourier transform spectroscopy, and Fourier transform infrared spectroscopy (FTIR) and combinations thereof. In a specific example, spectroscopy may be performed using coherent anti-Stokes Raman spectroscopy (CARS). The light reflecting, or in some methods passing through, the chemical sample may be captured by interrogation device 12 and transmitted to receiver 14.

Receiver 14 may be located within subterranean wellbore 4, adjacent and/or near interrogation device 12. In examples, illustrated in FIG. 1, receiver 14 may be located on the surface outside of subterranean wellbore 4. As illustrated in FIG. 2, receiver 14 may comprise a high pass filter 24, a photodiode detector 26, low pass filter 22, and/or digitizer 28. Light captured within interrogation device 12 during interrogation may be transmitted to receiver 14 in some examples by fiber optic lines 8. Captured light, when transmitted to receiver 14, may be scattered from irradiating the chemical sample. Within receiver 14, the scattered light may be focused after the anti-Stokes transition using a high pass filter 24. A high pass filter 24 is an electronic and/or optical filter that passes signals with a frequency higher than a certain cutoff frequency and attenuates signals with frequencies lower than the cutoff frequency. A photodiode 26 may extract the separation between low frequency signals, which may be detected between the vibrational levels in the RF range. Traveling through the photodiode 26, the signal may pass through a low pass filter 22 that extracts the RF beat frequency, which may carry the spectral information. This spectral information, signal, may then be sent to a digitizer 28 that allows for a high resolution spectral image of the chemical sample. High resolution spectral images may be produced within an information handling system 6, as illustrated in FIG. 2. Information handling system 6 may display the information for an operator's review. Information provided to the operator may allow the operator to manipulate frequency comb module 10. Varying the frequencies may be accomplished by manipulating the amplitude, wavelength, and/or other properties of light produced by first frequency comb 16 and a second frequency comb 18. Different and varying frequencies may produce additional spectral information and a more complete spectrum of the analyzed chemical sample.

In addition a phase spectra of the chemical sample may be obtained by interfering the signal that passes through the sample with a local oscillator and detecting the resulting light using a balanced photodiode 26. Oscillators may use electronic circuitry to produce a periodic oscillating electronic signal, which may be a sine wave or a square wave, or any combination thereof. Passing light through a local oscillator and detecting the resulting light may be known as optically multi-heterodyne-detected femtosecond Raman-induced Kerr-effect spectroscopy (RIKE). A Raman comb, resulting from the Stokes comb may pass through a sample, interference with a local oscillator frequency comb may create a very small frequency offset compared to the Raman comb. The resulting interfered signal may be split with a polarizing beam splitter and detected by receivers. A resulting signal may extract both the amplitude (gain) spectrum and the phase shift. Producing an amplitude spectrum, a phase shift, and/or a high resolution spectral images may allow for the different chemicals within the chemical sample to be identified using different methods. For example, two methods that may be used for identifying produced spectra. An operator may use a method which may involve comparing the chemical sample spectrum with spectra from known sample libraries. An additional method may use endmember extraction to identify a chemical sample.

Known sample libraries may comprise previously obtained spectra of materials within a laboratory setting. These known spectrums may be compared to the spectrums found within the chemical sample. Using goodness-of-fit, likelihood ratio test, and/or by taking inner products, the liner combination of spectra from the library with the highest score coefficients are reported and the corresponding spectral peaks are assigned to that material. A method using libraries may be efficient and particularly useful when the vast majority of material components of the chemical sample are known. When the material components are not know, using an endmember extraction method may be warranted.

Endmember extraction may be useful to identify spectra when the material components may not be known. When using endmember extraction for this application, the reoccurrence of groups of peaks may be extracted. For example, if unknown chemical A has peaks 1 and 2, unknown chemical B has peaks 2 and 3, and unknown chemical C has peaks 4 and 5, then the resulting spectrum may comprise of 5 peaks and may be generated anywhere between 1 and 5 chemicals. By examining how the amplitude of peaks correlate with each other as the concentrations of the chemicals evolve during a job, it may be determined that peak 2 may be common to two chemicals while chemical C may be independent of both A and B. Endmember extraction may often be used in hyperspectral imaging (particularly in satellite imaging where the spectra from multiple substances on the geological surface may all contribute to the signal the satellite receives). Common methods for endmember extraction may be geometric endmember induction methods and lattice computing endmember induction methods. For geometric endmember induction, the method may determine the set of spectra that are all mutually orthogonal, which may generate the smallest convex set (basically the small spectral volume that includes all the data. Lattice computing endmember induction, the morphology of the system may be eroded and dilated, obtaining the spectral components that contribute most. Although endmember extraction may be less efficient and less robust than the library method, it may extract out the spectral components not found in the library. Comparing a spectrum produced in an interrogation device 12 with a library or endmember extraction may be done using an information handling system 6. Information handling system 6 may be able to process the information fast, easier, and with less error than by hand. Endmember extraction may also be combined with library screening to extract out other spectrally orthogonal endmembers. This method may be accomplished using a library to identify known chemicals and then using those known spectra as a starting basis set to extract out other spectrally orthogonal endmembers.

Figure 3A:
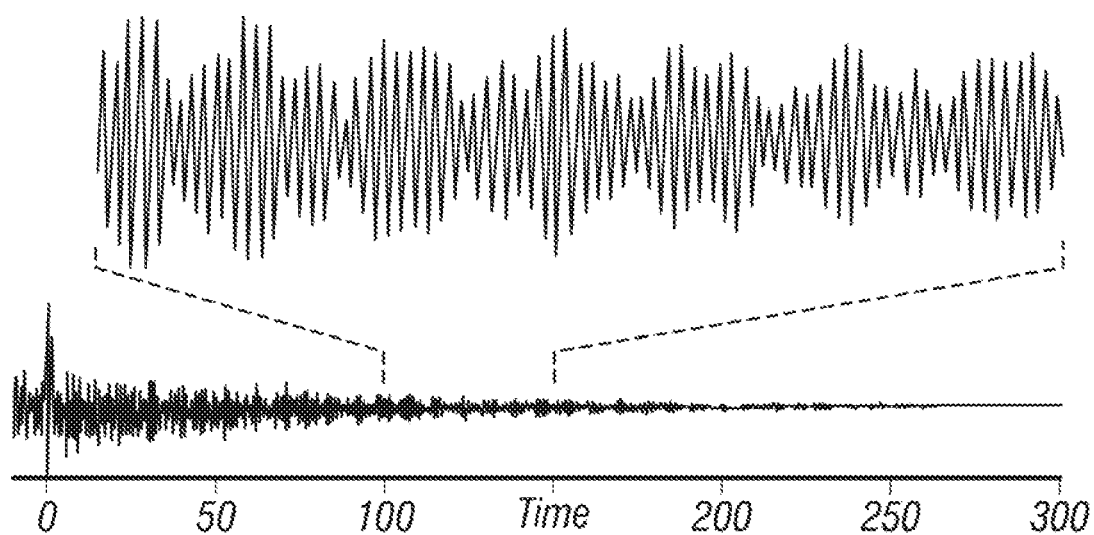
FIG. 3a is a schematic illustration of an example coherent anti-Stokes Raman scattering spectrum.
Figure 3B:
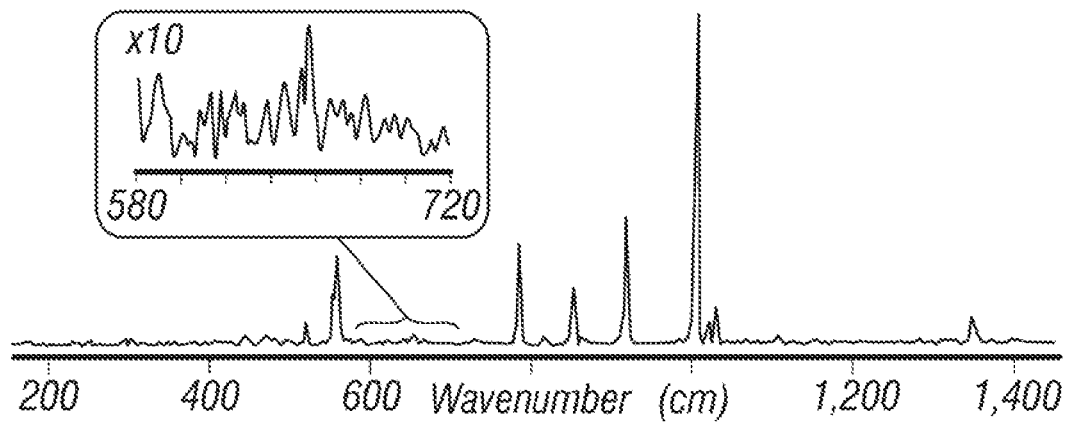
FIG. 3b is a schematic illustration of an example of a Fourier transform of a coherent anti-Stokes Raman scattering spectrum.
Figure 3C:
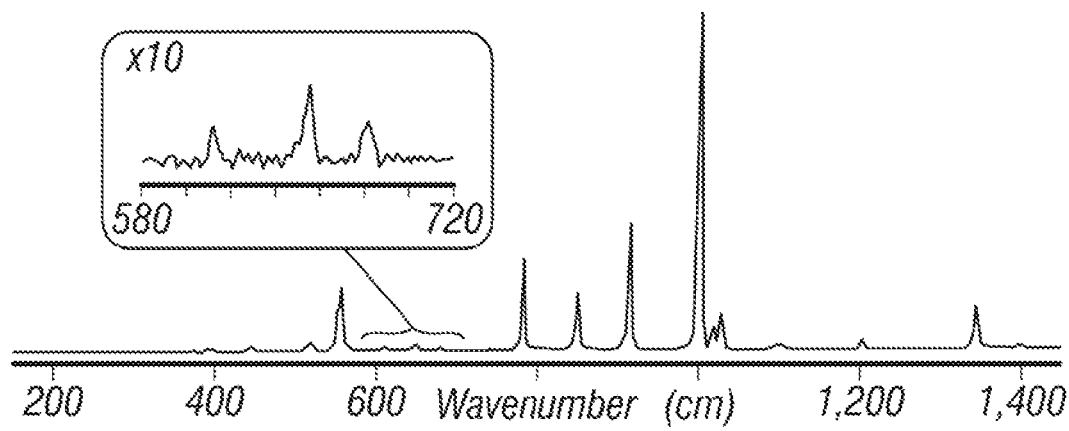
FIG. 3c is a schematic illustration of an example of comparing known chemical particle ranges to a Fourier transform of a coherent anti-Stokes Raman scatting spectrum.

Information handling system 6 may produce a graph, chart, diagram, and/or combination thereof to display results of testing a chemical sample. FIG. 3*a* may illustrate a measured amplitude time sequence of a chemical sample. The spectrum, as illustrated in FIG. 3*b*, (a Fourier Transform of FIG. 3*a*) may illustrate various vibration structures of a molecule, which may be indicated by the peaks within the spectrum. Using a library, known vibration structures of molecules may be compared to the spectrum in FIG. 3*b*. FIG. 3*c* may illustrate comparing known vibration structures of a molecule within a library to the chemical spectrum of the tested chemical sample. The peaks within the spectrum may help narrow down the chemicals within an analyzed chemical sample.

Therefore, the present invention is well adapted to attain the ends and advantages mentioned as well as those that are inherent therein. The particular examples disclosed above are illustrative only, as the present invention may be modified and practiced in different but equivalent manners apparent to those skilled in the art having the benefit of the teachings herein. Although individual examples are discussed, the invention covers all combinations of all those examples. Furthermore, no limitations are intended to the details of construction or design herein shown, other than as described in the claims below. It is therefore evident that the particular illustrative examples disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed is:

1. A method for analyzing a chemical sample within a wellbore, contained within an interrogation device, the method comprising:
   broadcasting a coherent light from a frequency comb module;
   directing the coherent light through a fiber optic line to the interrogation device;
   irradiating the chemical sample with the coherent light;
   capturing light resulting from the irradiation of the chemical sample; and
   producing a spectrum resulting from the captured light from the chemical sample.

2. The method of claim 1 further comprising capturing the chemical sample in the interrogation device in the wellbore, wherein the frequency comb module is not disposed within the wellbore.

3. The method of claim 1, wherein the fiber optic line extends into the wellbore.

4. The method of claim 1, wherein the frequency comb module comprises at least one frequency comb.

5. The method of claim 1, wherein the frequency comb module comprises a beam splitter and a low pass filter.

6. The method of claim 1, further comprising altering the irradiated light from the frequency comb module with an information handling system.

7. The method of claim 1, further comprising displaying the spectrum on an information handling system.

8. The method of claim 1, further comprising comparing the spectrum with an identified spectrum sample from a known sample library.

9. The method of claim 1, further comprising comparing the spectrum with endmember extraction.

10. The method of claim 1, wherein a receiver comprises a high pass filter and a photo-diode.

11. The method of claim 1, wherein producing a spectrum uses at least one technique selected from the group consisting of anti-Stokes Raman scattering and Raman-induced Kerr-effect spectroscopy.

12. A frequency comb system for analyzing a chemical sample, the frequency comb system comprising:
   a frequency comb module configured to broadcast a coherent light;
   a fiber optic line that extends into a wellbore, wherein the fiber optic line is configured to direct the coherent light from the frequency comb module to an interrogation device;
   the interrogation device configured to contain the chemical sample for irradiation by the coherent light;

a receiver positioned to capture light resulting from the irradiation of the chemical sample; and an information handling system operable to analyze the captured light and produce a spectrum resulting therefrom.

13. The frequency comb system of claim 12, wherein the frequency comb module comprises a first frequency comb and a second frequency comb.

14. The frequency comb system of claim 12, wherein the frequency comb module further comprises a beam splitter and a low pass filter.

15. The frequency comb system of claim 12, wherein the receiver comprises a high pass filter and a photo-diode.

16. The frequency comb system of claim 12, wherein the receiver further comprises a low pass filter and a digitizer.

17. The frequency comb system of claim 12, wherein the interrogation device analyzes the chemical sample using anti-Stoke Raman scattering.

18. The frequency comb system of claim 12, wherein the information handling system produces a phase spectrum using Raman-induced Kerr-effect spectroscopy.

19. The frequency comb system of claim 12, wherein the frequency comb module is not disposed within the wellbore.

20. The frequency comb system of claim 12, wherein the frequency comb module further comprises a femtosecond laser.

* * * * *